United States Patent
Parthasarathy et al.

(10) Patent No.: US 9,720,671 B2
(45) Date of Patent: Aug. 1, 2017

(54) INSTALLATION OF CUSTOMIZED APPLICATIONS

(75) Inventors: Srinivasan Parthasarathy, Redmond, WA (US); Chandrudu Pokala, Bothell, WA (US); Soren Francker, Kirkland, WA (US); Heriberto Coll, Bothell, WA (US); Christopher P. Stine, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1486 days.

(21) Appl. No.: 12/140,442

(22) Filed: Jun. 17, 2008

(65) Prior Publication Data
US 2009/0313619 A1 Dec. 17, 2009

(51) Int. Cl.
*G06F 9/445* (2006.01)

(52) U.S. Cl.
CPC ..................................... *G06F 8/61* (2013.01)

(58) Field of Classification Search
CPC ... G06F 8/61; G06F 8/65; G06F 21/10; H04L 62/12; H04L 67/304; H04L 67/34; H04L 69/329
USPC .................. 717/174, 178, 168; 713/165, 189
See application file for complete search history.

(56) References Cited

U.S. PATENT DOCUMENTS

| | | | |
|---|---|---|---|
| 5,950,010 A | 9/1999 | Hesse et al. | |
| 6,279,154 B1 | 8/2001 | Davis | |
| 6,282,711 B1 | 8/2001 | Halpern et al. | |
| 6,297,819 B1 | 10/2001 | Furst | |
| 6,874,143 B1 | 3/2005 | Murray et al. | |
| 7,159,018 B2 | 1/2007 | Amro et al. | |
| 8,255,902 B1 * | 8/2012 | Satish | G06F 8/61 713/189 |
| 2003/0188160 A1 * | 10/2003 | Sunder | G06F 8/65 713/165 |
| 2005/0114362 A1 * | 5/2005 | Colleran | G06F 8/61 |
| 2007/0179883 A1 * | 8/2007 | Questembert | G06Q 20/06 705/39 |
| 2007/0215706 A1 | 9/2007 | Kotlarsky et al. | |
| 2007/0256072 A1 * | 11/2007 | Barr | G06F 8/61 717/174 |

FOREIGN PATENT DOCUMENTS

WO 2007075519 A3 7/2007

OTHER PUBLICATIONS

"Installing Third-Party Applications on your Device", Date Created: Nov. 1, 2000, pp. 1-2, http://kb.palmone.com/SRVS/CGI-BIN/WEBCGI.EXE7New,Kb=PalmSupportKB,ts=Palm External2001,Case=obj (2510).*

(Continued)

*Primary Examiner* — Wei Zhen
*Assistant Examiner* — Mohammed Huda
(74) *Attorney, Agent, or Firm* — Harness, Dickey & Pierce, P.L.C.

(57) ABSTRACT

The described implementations relate to installation of customized applications. One technique obtains a software application generated by a producer. The technique identifies customizations made by a customizer to the software application that are desired by a customer. The technique further installs the software application and the customizations on the customer's computer in a single operation.

17 Claims, 10 Drawing Sheets

(56) References Cited

OTHER PUBLICATIONS

"Easy Plugins Management in IntelliJ IDEA", pp. 1-10, Copyright: 2000-2008 Jet Brains, http://www.jetbrains.com/idea/features/open_api_plugin_manager.html.

"Installing Third-Party Applications on your Device", Date Created: Nov. 1, 2000, pp. 1-2, http://kb.palmone.com/SRVS/CGI-BIN/WEBCGI.EXE?New,Kb=PalmSupportKB,ts=Palm_External2001,Case=obj (2510).

Sanjeev Anirudh "What is OneClick", Date: Aug. 11, 2007, pp. 1-21, http://anirudhsanjeev.org/oneclick-plugin/.

* cited by examiner

INSTALLATION OF CUSTOMIZED APPLICATIONS

BACKGROUND

The present discussion relates to software applications and customizations to software applications. A software application or software product (hereinafter, "application") can be any computer-readable instructions that when processed on a computing device performs a function or functions. Applications are available for a myriad of situations, such as calendaring/time management, word processing, accounting, etc. Invariably in the market place of ideas, changes are proposed to potentially improve an application for a particular scenario. For instance, such changes may relate to adding, changing, or deleting a functionality offered by the application. In other instances the changes may relate to an appearance of a graphical user interface (GUI) generated by the application. Parties referred to herein as "customizers" offer customizations to an application to achieve one or more changes to the application. The combination of the application and the customizations can be installed on a computing device as a customized application. Traditionally, installing customized applications on a computing device is a burdensome and confusing task for a user of the computing device. For instance, the user may have to obtain the application from a first source, such as by navigating to a particular web-site. The user then has to obtain the customizations from another source, such as from another web-site or via a physical media such as a compact disc (CD). The user then has to manually follow a set of instructions to eventually achieve installation of the customized application. The present concepts offer an easier solution for installation of customized applications.

SUMMARY

The described implementations relate to installation of customized applications. One technique obtains a software application generated by a producer. The technique identifies customization(s) made by a customizer to the software application that is/are desired by a customer. The technique further installs the software application and the customizations on the customer's computer in a single operation.

Another implementation hosts a site that relates to a software application from a producer and a customization to the software application from a customizer. The implementation associates the software application and the customization with a unique identifier. The implementation further supplies the software application and the customization responsive to receiving a query reciting the unique identifier. The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

Figure 1:
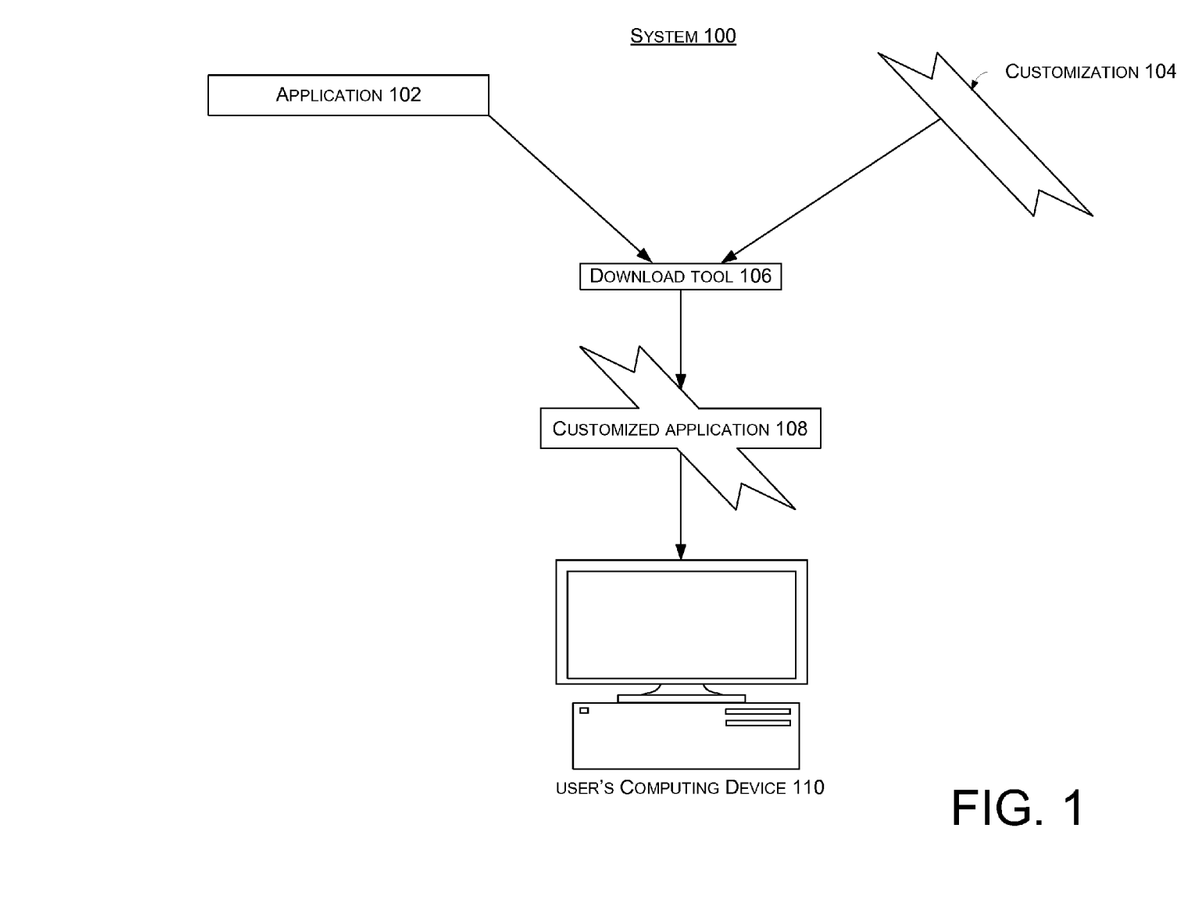
FIGS. 1-8 illustrate exemplary systems for installing customized applications in accordance with some implementations of the present concepts.

The present discussion relates to software applications and customizations to software applications. A software application or software product (hereinafter, "application") can be any computer-readable instructions that when processed on a computing device performs a function or functions. Applications are available for a myriad of situations, such as calendaring/time management, word processing, accounting, etc. Parties referred to herein as "customizers" offer customizations to an application to achieve one or more changes to the application. The combination of the application and the customizations can be installed on a computing device as a customized application. The present implementations offer ease of installation of customized applications. For instance, in one implementation shown in FIG. 1, an exemplary system 100 can include an application 102 and a customization(s) 104. A download tool 106 can facilitate installation of a customized application 108 on a user's computer 110 utilizing application 102 and customization 104. The download tool 106 can make the installation process much easier on the user, such as by reducing actions that have to be performed by the user to accomplish the installation.

Further Exemplary Systems

FIGS. 2-6 show exemplary systems relating to installation of customized applications. Several elements introduced in individual FIGURES appear in later FIGURES and as such are not subsequently reintroduced.

Figure 2:
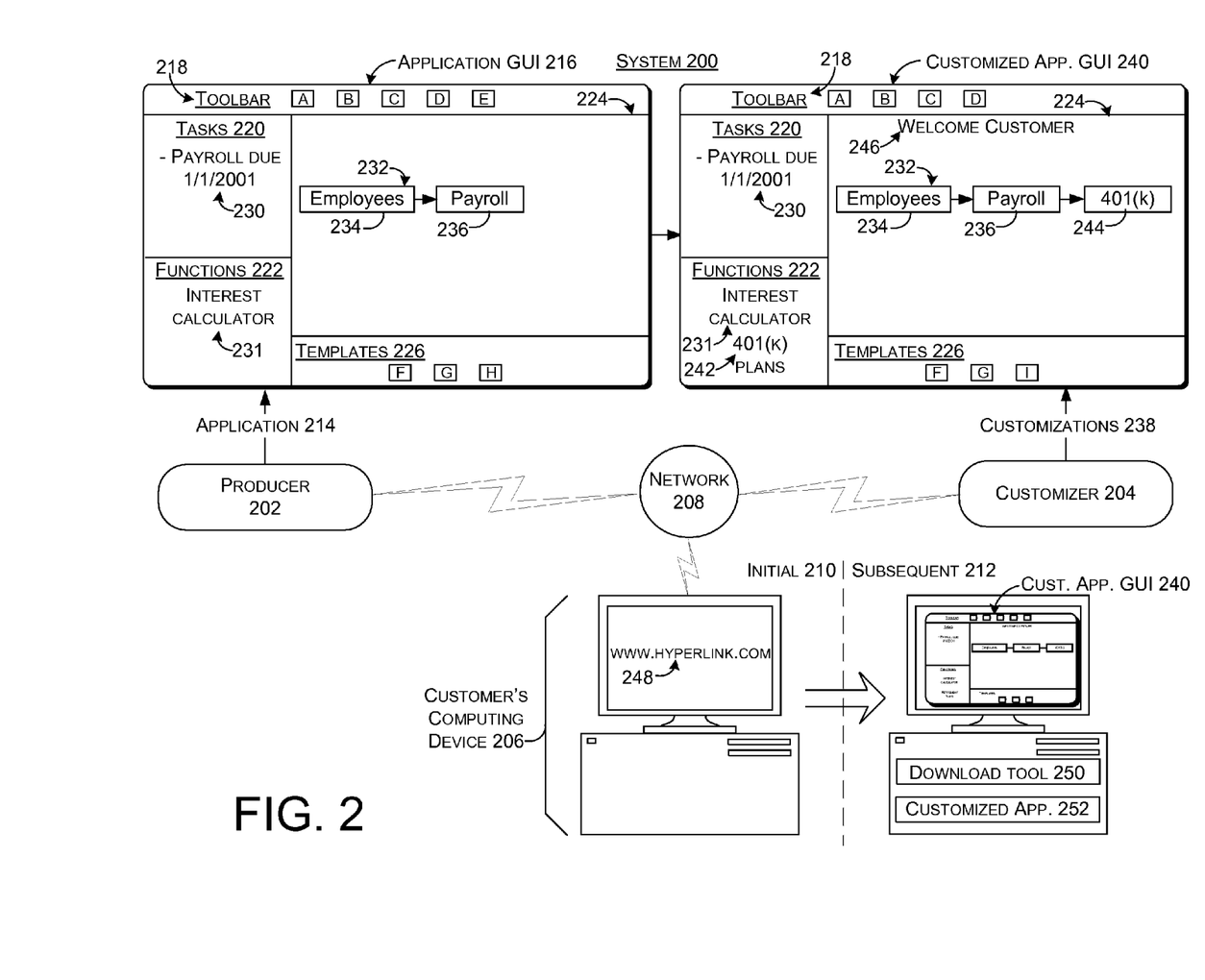

FIG. 2 involves a system 200 for installing customized software applications. In this implementation, system 200 includes a producer 202, a customizer 204, and a computing device 206 belonging to a user or customer. The producer 202, customizer 204, and computing device 206 are communicatively coupled via a network 208, such as the Internet. For purposes of explanation, computing device 206 is shown at an initial time 210 and at a subsequent time 212, both of which will be discussed in more detail below.

Producer 202 can create a product or application 214. The application can be any type of application, such as a word processing application, email application, accounting application, legal docketing application, spreadsheet application, or a myriad of other applications. For purposes of explanation in this implementation, application 214 is an accounting application. Further, for discussion purposes, application 214 is manifest here by a hypothetical application graphical user interface (GUI) 216. The skilled artisan should recognize that the depicted implementation is offered for purposes of explanation and that no limitation as to the type of application or the manifestation of the application is intended.

As illustrated, application GUI 216 includes a toolbar 218, a task pane 220, a functions pane 222, a main pane 224 and a templates pane 226. In this case, toolbar 218 offers hypothetical options "A", "B", "C", "D", and "E". Task pane 220 shows a single task of "Payroll Due Jan. 1, 2001" at 230. The functions pane 222 shows an interest calculator at 231. The main pane 224 shows a flowchart 232 that includes an employees element 234 and a payroll element 236. Templates pane 226 shows three templates "F", "G", and "H".

Customizer 204 can generate customizations 238 to application 214. Customizations can add, delete or alter the functionality and/or appearance of the application 214. In some instances, a customization may update a previous customization. Customizations 238, in combination with application 214, can produce a customized application (introduced below) that is introduced initially via a customized application GUI 240. Customizer 204 can be many different types of entities, but for purposes of explanation in the illustrated example, assume that customizer 204 is an accounting firm. Other entities that can act as customizers should become apparent from the description below. A brief list of potential customizers can include software companies, professional service providers, distributors, on-line merchants, etc.

In the illustrated instance, customized application GUI 240 is customized relative to application GUI 216 in several ways. For instance, customized application GUI 240 deletes option "E" from toolbar 218 when compared to application GUI 216. For example, the customizer may feel that option "E" is not needed by his/her customers and as such adds unneeded complexity to the application. In this sense, customized application GUI 240 deletes a functionality offered on application GUI 216. Customized application GUI 240 can also add functionality to application 214. For instance, customized application GUI 240 adds a "401(k) plans" link 242 to function pane 222. The "401(k) plans" link 242 can offer comparisons of various available 401(k) investment plans. Further illustrated functional changes include an additional 401(k) element of flowchart 232 as indicated at 244. The "401(k)" element 244 can track employee contributions to their respective 401(k) plans. Finally, in relation to template pane 226, the "H" template has been deleted when compared to application GUI 216 and a replacement template "I" has been added in its place. The customizer may feel that the "I" template is more readily understood by its customers than the "H" template.

Some customizations do not affect the functionality of the application 214, but instead are directed to the appearance of the application. For instance, in the customized application GUI 240, main pane 224 includes a greeting of "Welcome Customer" at 246. This customization addresses the look and feel of the customized application GUI 240 rather than the functionality offered through the GUI. Customizer 204 can make the customizations 238 in an attempt to better serve its customers and/or to distinguish it from producer 202 and/or competitors, such as other accounting firms.

The customer may desire to have the customized application represented by customized application GUI 240 on his/her computing device 206. For instance, assume for purposes of explanation, that customizer 204 is the customer's professional accounting firm. Assume further, that the accounting firm recommends that its customers or clients use the accounting firm's customized version of producer's application 214. At initial time 210, the accounting firm may send an email explaining the customized application to the customer's computing device 206. The email can contain a hyperlink 248 that the customer can click to obtain the customized application. Assume further in this case that the customer desires to have the customized application and clicks on the hyperlink 248.

In this implementation, clicking on hyperlink 248 can cause a download or distribution tool 250 to be downloaded and invoked on computing device 206. The download tool 250 then can obtain software application 214 and customizations 238 and install them on computing device 206 as a single unified customized application 252. The installation of customized application 252 can allow customized application GUI 240 to be generated on computing device 206 at subsequent time 212.

The download tool 250 can install the customized application 252 in a manner that requires less action on the part of the customer than traditional scenarios. In some of these cases, the download tool can install the customized application 252 in a manner that does not require any further affirmative acts on the part of the customer beyond clicking on hyperlink 248.

In some instances, the computing device's operating system may include various security features that require verification from the customer, but these security features may be invoked whether the user manually installed the application 214 and the customizations 238 or the download tool 250 automatically performed the installation. Regardless of any security issues that may be invoked, the present implementations offer a more streamlined installation process of customized application 252 from the customer's perspective.

Figure 3:
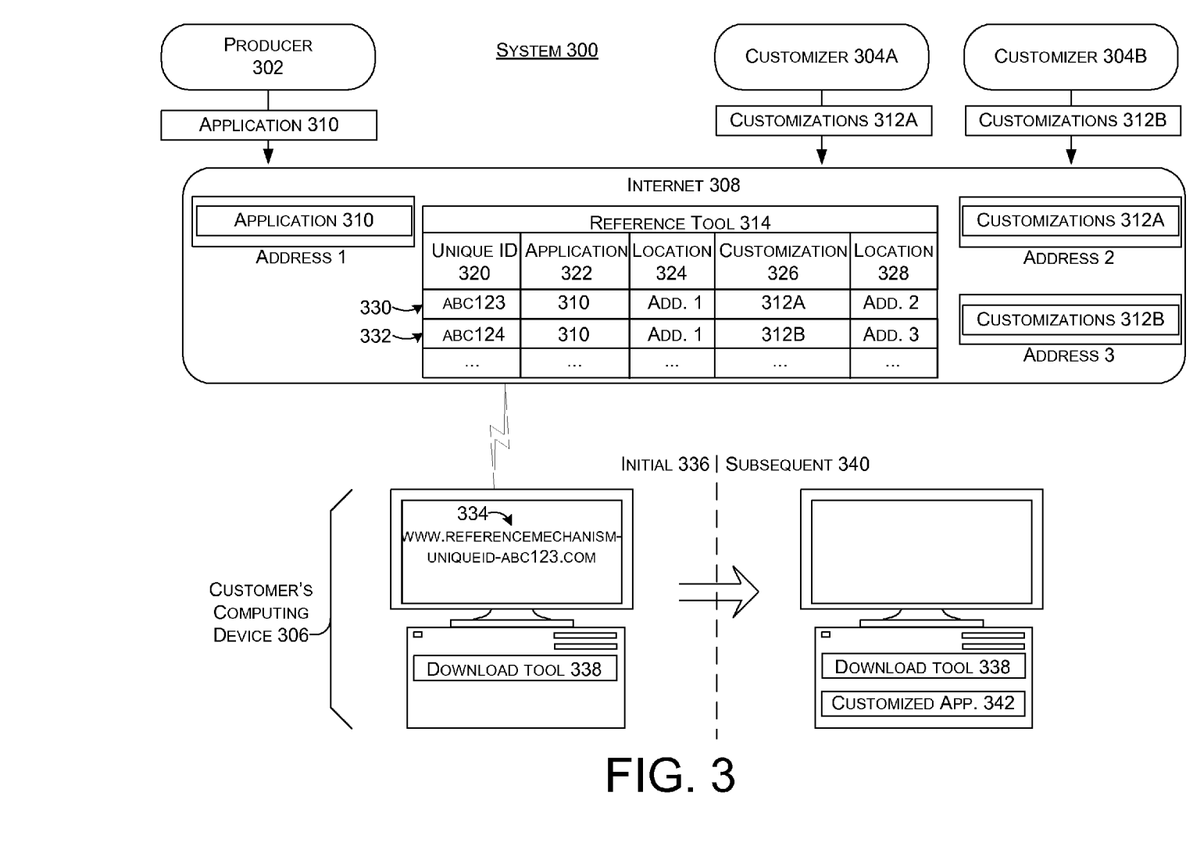

FIG. 3. involves another system 300 for installing customized software applications. In this scenario, system 300 includes a producer 302 and two customizers 304A, 304B. System 300 further includes a customer's computing device 306 coupled to the Internet 308.

Producer 302 produces an application 310 and makes the application available on the Internet 308. Customizer 304A makes customizations 312A directed to application 310 and makes the customizations available on the Internet 308. Similarly, customizer 304B makes customizations 312B directed to application 310 and makes the customizations available on the Internet 308.

In this implementation a reference tool 314 is also available on the Internet 308. The reference tool 314 offers a way to cross-reference specific applications with specific customizations. In this case, the reference tool is manifest as a data table that constitutes five vertical columns; a "unique identification (ID)" column 320, an "application" column 322, a "location" column 324, a "customization" column 326, and a "location" column 328. Individual horizontal rows can serve to relate an individual customization to an individual application and provide a means for referencing the combination. For instance, a horizontal row 330 is assigned a unique ID of "ABC123" as evidenced by the intersection with column 320. The unique ID provides an easy reference for the combined application and customizations specified in row 330. An intersection of row 330 and column 322 indicates that row 330 relates to application 310 and column 326 indicates that row 330 relates to customization 312A. Column 324 lists a hypothetical address of "address 1" where application 310 is located. An intersection of columns 326 and 328 with row 330 indicates that customization 312A is located at hypothetical "address 2".

Similarly, row 332 contains a unique identifier of "ABC124" and relates to application 310 and customization 312B. The location of application 310 remains "address 1" while customization 312B is located at "address 3" as indicated at the intersection of row 332 and column 328. The skilled artisan should recognize that actual addresses, such as Internet addresses can be utilized rather than the hypothetical addresses utilized here for sake of brevity.

The purpose of reference tool 314 should become apparent from the following hypothetical example. Briefly, the reference tool can provide a registration service that associates applications and customizations. Continuing with the example of FIG. 2 assume that the customer utilizes customer's computing device 306 to access their accounting firm's web-site. The web-site advises the customer to install the accounting firm's customized accounting software by clicking on the hyperlink 334 shown at initial time 336. Assume further that in this example a download tool 338 is already resident on the customer's computing device 306.

Responsive to the customer clicking on link 334, the download tool 338 accesses the reference tool 314 and locates the unique identifier "ABC123" contained in the link 334. The unique identifier "ABC123" is located in row 330 which conveys that the customer wants to install application 310 with customizations 312A. The download tool 338 can obtain the application and the customizations at the respective locations specified in row 330. The download tool can then download application 310 and customizations 312A to customer's computing device 306. At subsequent time 340, the download tool then installs the application and customizations as customized application 342. The customized application 342 is then available for the customer's use. This implementation can install the customized application 342 on the customer's computer without any action on the part of the customer beyond clicking on hyperlink 334.

Figure 4:
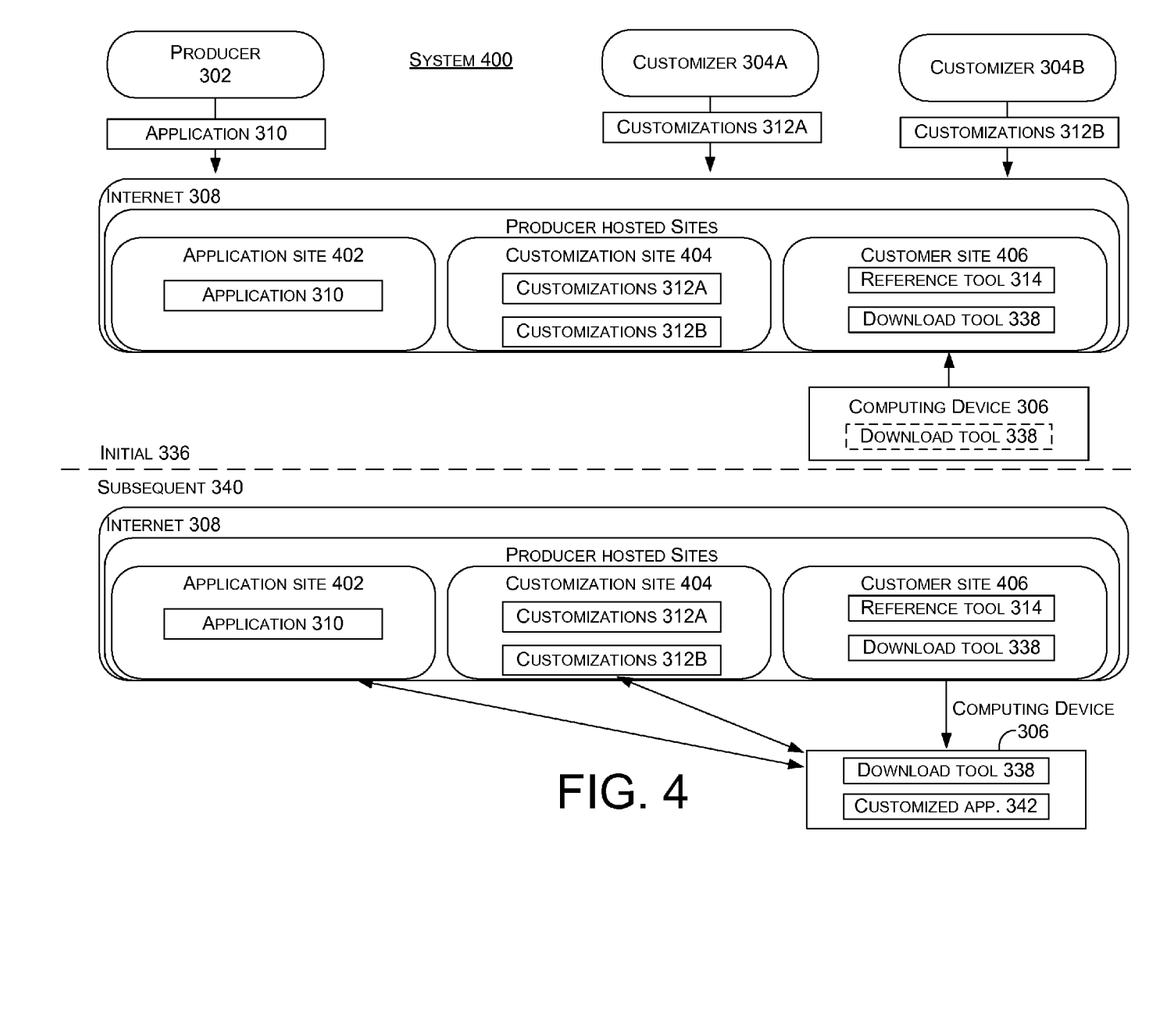

FIG. 4 shows a system 400 that builds upon the example of FIG. 3 and focuses on possession and/or control of application 310 and customizations 312A, 312B. The configuration presented in FIG. 4 can allow producer 302 to maintain possession of application 310 and to deliver the application directly to the end user or customer. This configuration can allow the producer to ensure the integrity of the application and/or to avoid legal issues, such as negotiating a redistribution license with individual customizers 304A, 304B. Here, producer 302 hosts three web-sites on the internet 308: an application site 402, a customization site 404, and a customer site 406.

At initial time 336, the customer accesses customer site 406, such as through hyperlink 334 of FIG. 3. Hyperlink 334 can contain a unique ID that is contained in reference tool 314 (FIG. 3). The customer site 406 can contain a copy of download tool 338. In an instance, where the download tool is not already present on the customer's computing device 306, a copy can be installed from the customer site 406. In either instance, the download tool can handle further installation tasks that would otherwise have to be completed by the customer.

At subsequent time 340, the download tool 338 can obtain the application and customization associated with the unique ID and their respective locations from the reference tool 314. In this case, application 310 can be obtained from application site 402 and the customization can be obtained from customization site 404. The download tool 338 can obtain and download the associated application and customization (s) onto the customer's computing device 306 for installation. The download tool can utilize the application and customizations to install customized application 342. In this configuration, application 310 remains under the control of producer 302 until the application is delivered to the customers (i.e., end users) computing device 306.

In this case, producer 302 hosts application site 402, customization site 404, and customer site 406. The producer can send application 310 to application site 402. The producer can also receive customizations 312A, 312B for the application 310 from various customizers 304A, and 304B. The producer 302 can assign a unique ID to the customizations and send the customizations to customization site 404. The unique ID is sent to the respective customizer and to reference tool 314. The customizer can get the resulting customized application installed on their customer's computing devices simply by sending a hyperlink to the customer.

From the customer's perspective, they can simply click on a link and the customized application is automatically installed on their computer. The customer need not know that the customized application includes code from two different sources or where the code was located prior to installation on the customer's computing device. Further, the customer need not know the nuances of installing both the application 310 and the customizations 312A (or 312B) or how to get the application and the customizations to operate as an integrated component (i.e., the customized application 342).

While the illustrated configuration can offer several benefits regarding management of application 310, other configurations can also be implemented. For instance, in one configuration, producer 302 can host and maintain control of application 310 and customizers 304A, 304B can host and maintain control of customizations 312A, 312B respectively. One of the producer, the customizer or another different party can host customer site 406. In still another configuration, a customizer or another different party can host the sites 402, 404, and 406 hosted by the producer in the illustrated configuration.

Figure 5:
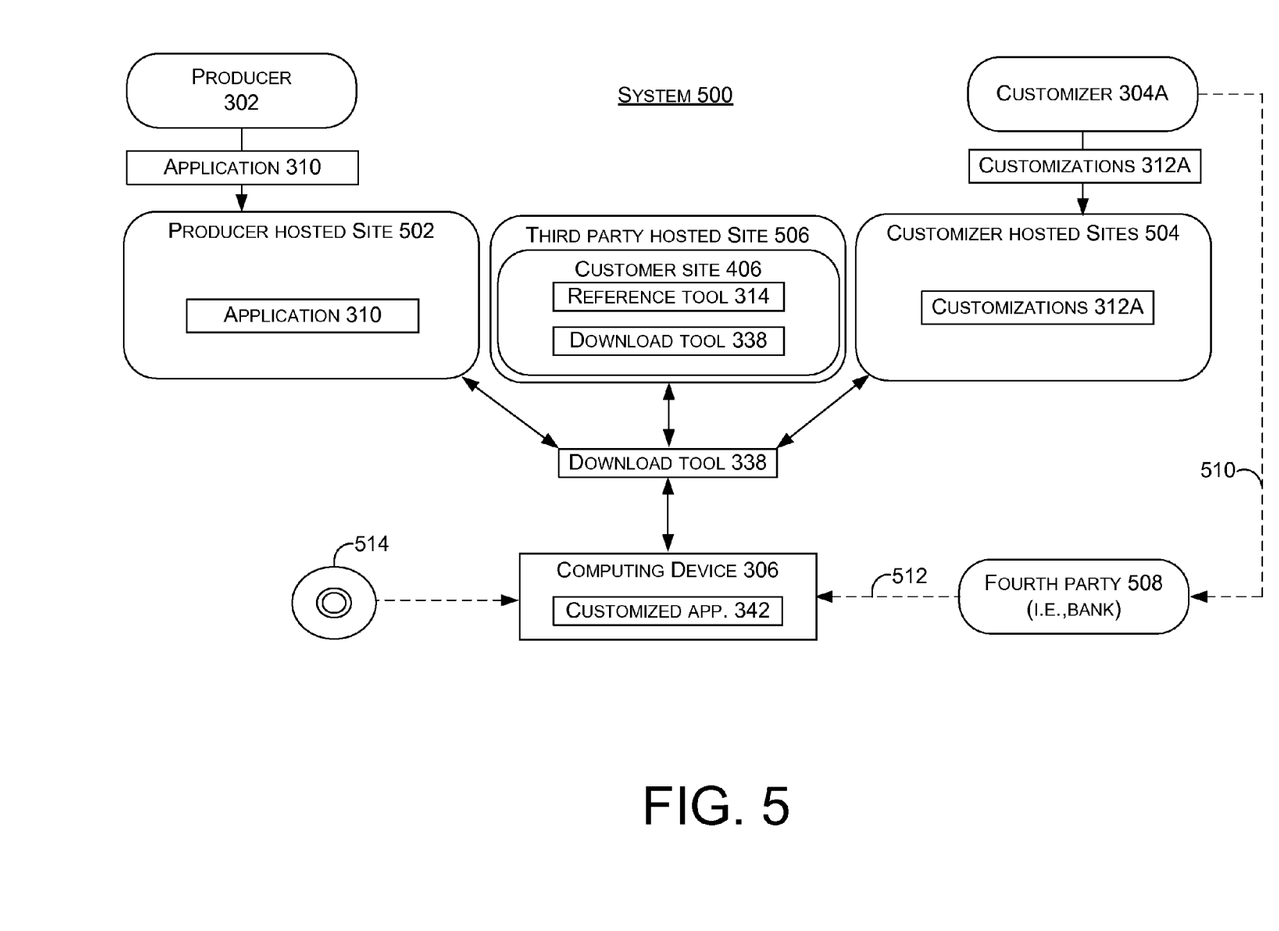

FIG. 5 shows a system 500 that offers further variations to the concepts described above in relation to FIGS. 3-4. In this implementation, producer 302 hosts application 310 on a producer hosted site 502. Customizer 304A hosts customizations 312A on a customizer hosted site 504. Further, a third party hosted site 506 hosts customer site 406. In this case, the third party site is hosted by a party other than producer 302 or customizer 304A. The third party can function as an intermediary that protects the rights of both the producer and the customizer. The third party hosted site 506 can host customer site 406 that can contain reference tool 314 and download tool 338. As will be explained below, some scenarios can involve still another different party designated here as fourth party 508.

For purposes of explanation, consider an example introduced above where application 310 is an accounting application. Further, assume customizer 304A is a software vendor that offers customization services to application 310. Finally, assume that fourth party 508 is a bank that desires to have a customized version (i.e., customized application 342) of application 310 to offer to its banking customers. Toward this end, the bank can contract with customizer 304A to generate the customizations 312A. The customizer can register the customizations with reference tool 314 at customer site 506 and can receive a unique ID in return. The customizer can supply the unique ID in a hyperlink to the customer site 406 to the fourth party as indicated at 510. The fourth party or bank can notify its customers of the availability of the bank's customized software such as via a communication 512 to customer's computing device 306.

Activation of the hyperlink contained in communication 512 on the customer's computing device 306 can cause download tool 338 to access reference tool 314 and obtain application 310 and customizations 312A and to ultimately install customized application 342 on the customer's computing device 306. This configuration can allow for ease of installation of the customized application 342 for the customer. Further, this configuration can allow the bank to present the customized application to the client or customer as a product offered by the bank. Alternatively or additionally, this configuration can maintain confidentiality between the bank and its customers. For instance, the bank does not have to provide information, such as email addresses of its customers to other parties or allow other parties to send communications to the customers.

While the fourth party 508 is represented as a bank in system 500, the fourth party can be one of many types of entities. For instance, the fourth party could be the accounting firm described above in relation to FIG. 2. In such a scenario, rather than making the customizations themselves, the accounting firm could contract with customizer 304A to program the customizations. Other potential entities that could act as fourth parties can include other professional service providers, distributors, and retailers, among others.

For sake of brevity the above examples relate to a single customization being applied to an application. In some scenarios, two or more customizations can be integrated with a single application. The two or more customizations may be created by a single customizer or two different customizers.

The above implementations involve both the application 310 and the customizations 312A being hosted on the Internet. In other implementations, one or both of the application and customizations may be stored on a physical media 514. Examples of physical media can include compact discs (CDs), digital versatile disks (DVDs) and flash drives, among others. For instance, in one scenario, the physical media 514 may have application 310 and download tool 338 stored thereon. The media can be sent to the customer for use on computing device 306.

In one example, connecting the physical media 514 to the computing device such as by inserting a CD version in a CD drive can cause the download tool 338 to run. The download tool can obtain a unique identifier and go to reference tool 314 to obtain the corresponding customizations. In some cases the unique identifier may be included on the physical media 514. In another instance, the customizer may send the unique identifier to the customer. In still another instance, the download tool may utilize reference tool 314 to present a list of available customizations to the user on computing device 306. Responsive to a user-selection, the download tool can then locate and download the customizations and install the customized application 342 on computing device 306.

Another variation can store the customizations 312A on the physical media. The download tool 338 can then obtain application 310 over the Internet. The download tool can utilize the combination of the customizations and the application to install customized application 342 on computing device 306. Still another implementation may allow the download tool 338 to present a list of available applications and corresponding customizations to the user on computing device 306. Upon a user-selection, the download tool 338 can obtain the selected application and customizations to install as customized application 342 on the computing device 306.

In still another variation, some implementations, rather than being a one-time occurrence, can entail multiple renditions or be on-going. For instance, one such scenario can involve updates to the customizations. In the example of FIG. 5, the fourth party 508 could update the products or services that they offer via the customized application 342. The fourth party could instruct the customizer 304A to update the customizations 312A to reflect the changes. Once the updated customizations are available, the customizer 304A or the fourth party 508 can send a notification to computing device 306. The download tool can then obtain the updated customizations and install an updated customized application (not specifically designated) on computing device 306. In another case, the download tool may periodically go and look for updates that correspond to either of the application 310 and customizations 312A and utilize the updates to install the updated customized application.

Figure 6:
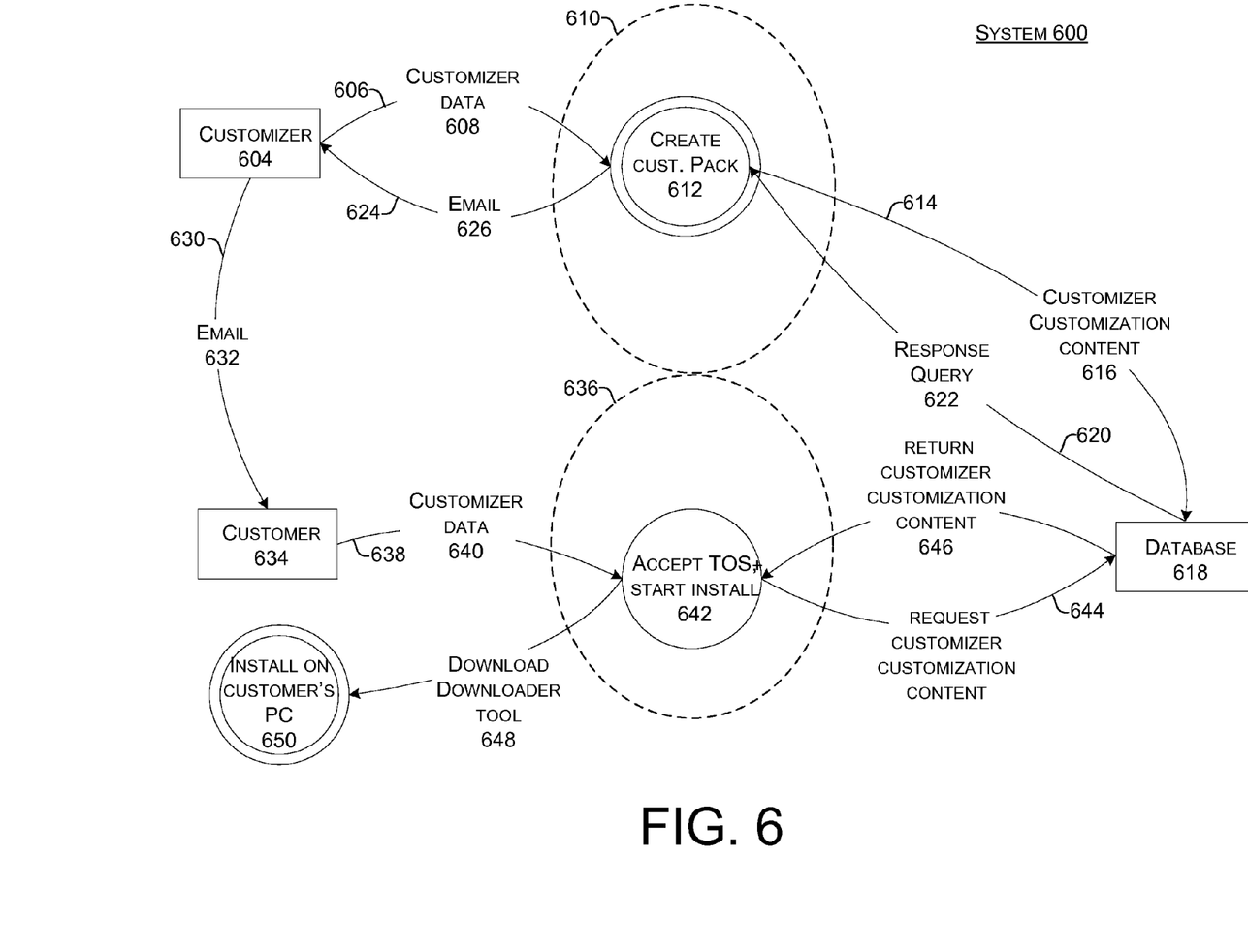
Figure 7:
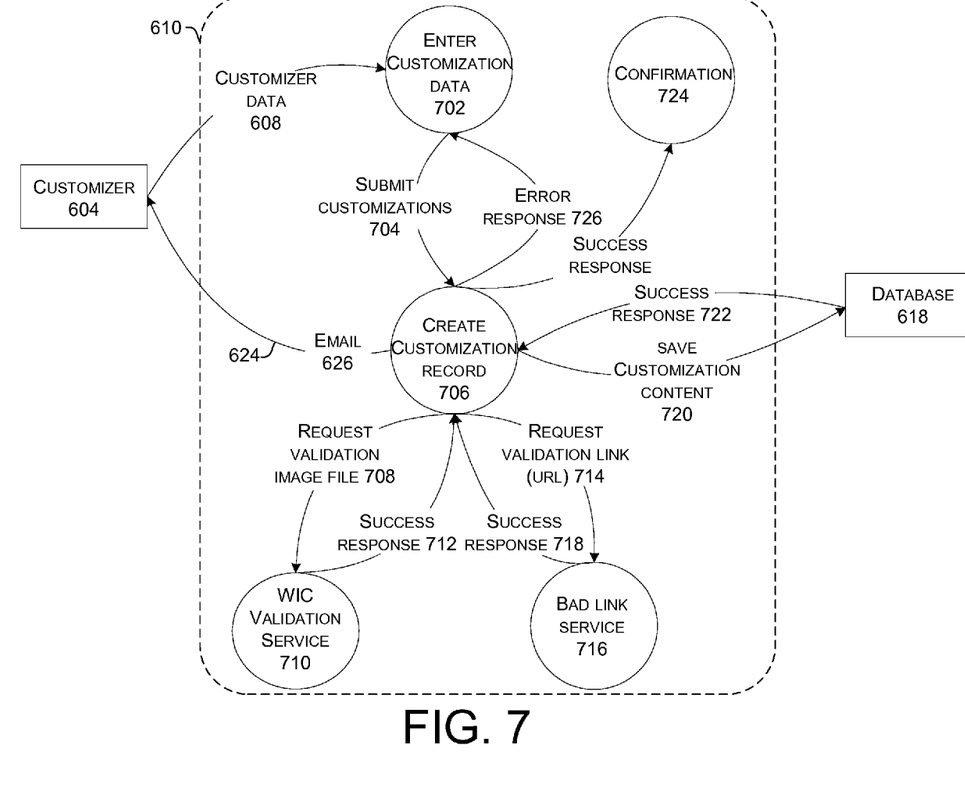
Figure 8:
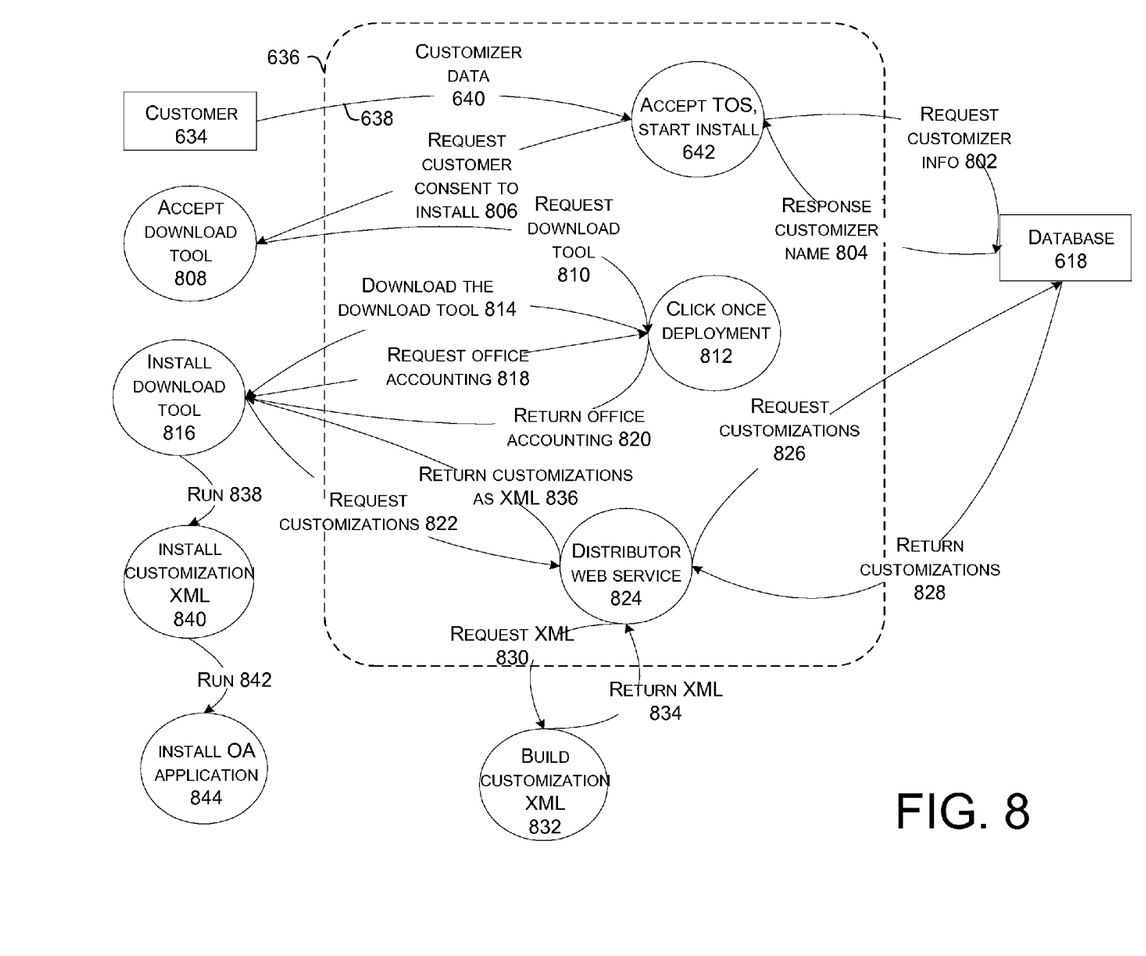

FIG. 6 shows a detailed view of a system or technique 600 for customizing and distributing a software application. FIGS. 7 and 8 drill down into more detail relative to two aspects of system 600.

In relation to system 600, a customizer 604 can create customizations for a software application. For explanation purposes, system 600 is described in relation to a scenario where the software application is Office Accounting brand accounting software produced by Microsoft Corporation. The present concepts are equally applicable to other applications.

As indicated by arrow 606, customizer 604 can send customizer data 608 to begin a general process 610 around creating a customization pack 612. For instance, customizer data 608 can include customization content (e.g. URL links, image files, xml files including custom data, custom settings, etc.) entered by customizer 604 to create the customization pack at 612. General process 610 is illustrated in more detail below in relation to FIG. 7.

At 614, system 600 stores the input from the customizer (i.e., customizer customization content) 616 in database 618. In this case, the customizer's input 616 is stored in database 618 and is associated with the customizer 604 using a unique ID.

At 620, database 618 returns a response query 622 that recites the unique id. At 624, an email 626 is forwarded to the customizer 604. Email 626 can contain some or all of the information contained in response query 622.

At 630, customizer 604 can distribute an email 632 to a customer 634. Email 632 can include information contained in email 626 that was sent to customizer 604. For instance, email 632 can include the unique ID associating the customization and software application. Email 632 can be utilized by the customizer to promote or espouse the value of the customized application offered by customizer 604.

If the customer 634 is interested in having the customized application on his/her computer or PC, then the customer 634 can start an overall process 636 of installing a customized version of the producer's software on the customer's PC. Overall process 636 is illustrated in greater detail below in relation to FIG. 8. Initially, at 638, customizer data 640 that can include information from email 632 is sent from, or by, customer 634 for use in overall process 636.

Customizer information 640 is utilized in a process 642 where the customer 634 accepts terms of service or use (TOS) and starts the installation process. The terms of use can be defined in an agreement that is presented to the customer. For instance, the customizer information can include information from response query 622 such as the URL link that opens a site that requests customer 634 to accept the terms of use before starting the installation of the customized version of the software application.

Once the customer has accepted the terms of use, at 644 the system 600 can use the unique ID from query 622 to request the customization content from customizer 604 and the software application (if not already installed on the customer's PC) stored in database 618. At 646, database 618 returns the customization content from customizer 604 and the software application (if not already installed on users PC) for use by a "distributor program or download tool" as part of the installation process on the customer's PC. The download tool is downloaded to the customer's PC at 648.

The download tool is then installed on the customer's PC at 650. As will be described in more detail below in relation to FIG. 8, the download tool can use the unique ID to request, download, and install the customized versions of the application on the customer's PC. In some cases, the download tool can facilitate the download and installation process such that the installation of the customized application can be accomplished responsive to a single click by the customer.

FIG. 7 shows slightly more detail regarding general process 610 for creating customization pack 612 (FIG. 6) for the software application. In this case, the customizer data 608 is entered at 702. This process then submits customizations at 704 to create a customization record at 706. The process requests a validation image file at 708 from a Windows integrity Control™ (WIC) validation service 710. The WIC validation service 710 can generate a success response 712 in an instance where the image file is validated.

The process then requests a validation link (URL) at 714 from a bad link service 716. The bad link service checks the link received at 714 and returns a success response 718 in an instance where the link is valid.

Customization content is then saved to database 618 at 720. If the save is successful, then a success response is returned by the database at 722. Success response 722 is utilized to create a confirmation at 724. If a success response 722 is not received from database 618, then an error response 726 is generated such that customization data can be reentered at 702.

FIG. 8 shows slightly more detail regarding the overall process 636 of installing a customized version of the producer's software application on the customer's PC. As introduced in relation to FIG. 6, process 636 serves to install a download tool on a customer's PC. The download tool then completes installation of the application and customization on the PC.

As mentioned above, at 642, processing starts with customer 634 sending customizer data 640 and accepting terms of service to start installation at 642. At 802, customizer information is requested from database 618. For instance, the request for customizer information can include the unique ID contained in the customizer data of response query 622 (FIG. 6). The database can responsively provide the customizer's name and/or other information at 804. At 806, the process requests consent from the customer to install the download tool. At 808, the customer accepts the request to install the download tool. At 810, the download tool is requested responsive to the customer's approval. At 812 'click once' technology is deployed to facilitate the installation process. The click once technology downloads the download tool at 814 and the download tool is installed at 816. The download tool then requests the Office Accounting application at 818. The Office Accounting application is returned to the download tool at 820.

At 822, the download tool requests customizations from a distributor web service 824. For instance, the download tool may request the customizations by utilizing the customizer's unique ID. At 826, distributor web service 824 requests the customizations from database 618. The database returns the customizations at 828 to the distributor web service 824.

In some instances, at 830 the distributor web service 824 may request that the customizations be formatted in XML or another format. The customizations can be built in XML format at 832 and returned to the distributor web service at 834. In some of these cases, the producer of the software application may specify directions or guidelines for customizing the application in XML (or other) format. The XML formatting performed in relation to process 830 can then conform to the guidelines specified by the producer. The distributor web service returns the XML customizations to the download tool at 836. The download tool is run at 838 to install the XML customizations at 840. Finally, the download tool is run at 842 to install the Office Accounting application at 844. This process results in Office Accounting being installed with the customizations so that the customer simply sees the customized version of Office Accounting.

Exemplary Methods

Figure 9:
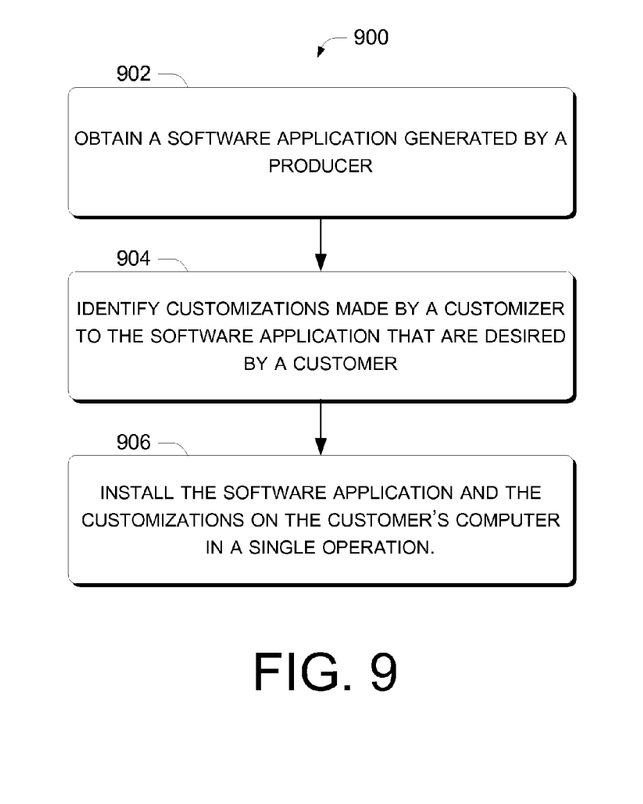
FIGS. 9-11 are flow diagrams of exemplary methods relating to installing customized applications in accordance with some implementations of the present concepts.

FIG. 9 illustrates a flowchart of a method or technique 900 that is consistent with at least some implementations of the present concepts. The order in which the technique 900 is described is not intended to be construed as a limitation, and any number of the described blocks can be combined in any order to implement the technique, or an alternate technique. Furthermore, the technique can be implemented in any suitable hardware, software, firmware, or combination thereof such that a computing device can implement the technique. In one case, the technique is stored on a computer-readable storage media as a set of instructions such that execution by a computing device causes the computing device to perform the technique.

At block 902, a software application (hereinafter, application) generated by a producer is obtained. In some cases, the application may be purposely designed by the producer to be readily customizable. In other instances, the producer may not have considered customization in the design of the application or at least may not have made efforts to facilitate customization.

Block 904 identifies customizations made by a customizer to the application that are desired by a customer. One technique for identifying the customizations utilizes a unique ID. The unique ID can be obtained from the customer. In some instances a reference tool can be accessed that associates the unique ID with the application and customizations. In some instances, the reference tool further provides the locations of the application and customizations.

Block 906 installs the software application and the customizations on the customer's computer in a single operation. The applications and customizations can be downloaded to the customer's computer and installed as a customized application. In some instances, the application and customizations can be obtained, downloaded, and installed without any affirmative acts on the part of the customer. Stated another way, from the customer's perspective, the obtaining, downloading, and installing can be perceived as a single operation that occurred responsive to a customer action, such as clicking on a hyperlink.

Figure 10:
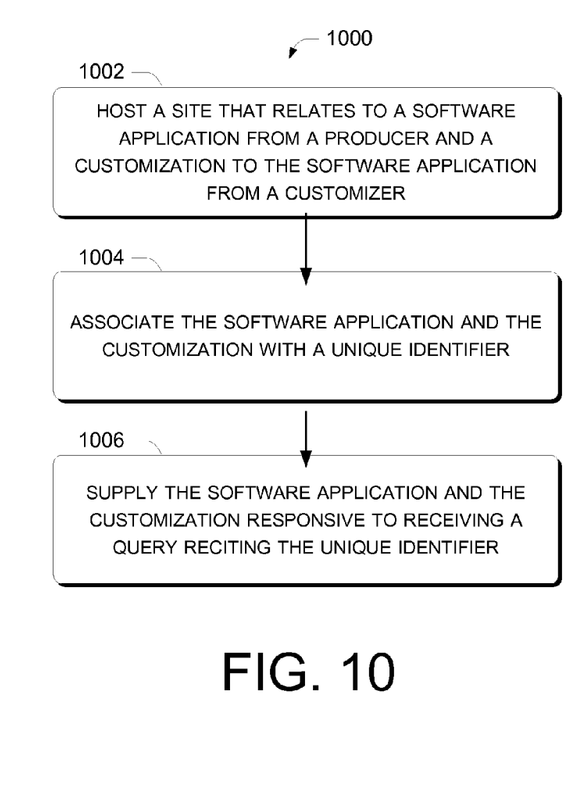

FIG. 10 illustrates a flowchart of another method or technique 1000 that is consistent with at least some implementations of the present concepts. The order in which the technique 1000 is described is not intended to be construed as a limitation, and any number of the described blocks can be combined in any order to implement the technique, or an alternate technique. Furthermore, the technique can be implemented in any suitable hardware, software, firmware, or combination thereof such that a computing device can implement the technique. In one case, the technique is stored on a computer-readable storage media as a set of instructions such that execution by a computing device causes the computing device to perform the technique.

Block 1002 hosts a site that relates to an application from a producer and a customization to the application from a customizer. In some cases, the site relates to the application and the customization by identifying where the application and customizations are located. In other instances, the application and/or customizations are located at the site.

In accordance with some implementations, the producer can host the site in a manner that allows the producer to retain control of the application. In one of these instances, the producer hosts sites that contain both the application and the customizations. In other cases, other parties, such as the customizer or still other different parties can host sites in which the application and/or customization are located.

Block 1004 associates the application and the customization with a unique identifier. In one configuration, the application and customization are associated with the unique identifier via a reference tool. The reference tool can also include the location of the application and/or customization. In some cases, the reference tool can include links to the application and the customization associated with the unique identifier.

Block 1006 supplies the application and the customization responsive to receiving a query reciting the unique identifier. In such a case, the process locates the application and customization and supplies them for download to a computer from which the query emanated.

Figure 11:
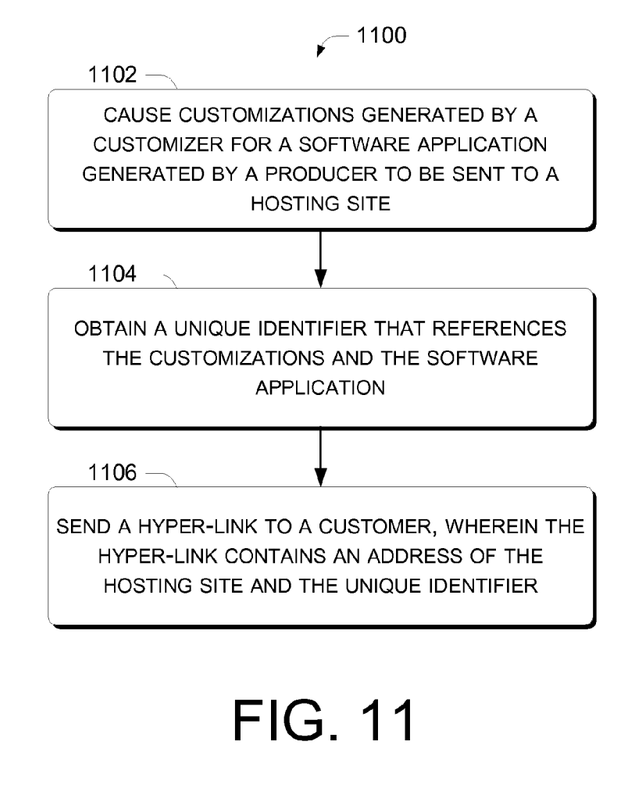

FIG. 11 illustrates a flowchart of a method or technique 1100 that is consistent with at least some implementations of the present concepts. The order in which the technique 1100 is described is not intended to be construed as a limitation, and any number of the described blocks can be combined in any order to implement the technique, or an alternate technique. Furthermore, the technique can be implemented in any suitable hardware, software, firmware, or combination thereof such that a computing device can implement the technique. In one case, the technique is stored on a computer-readable storage media as a set of instructions such that execution by a computing device causes the computing device to perform the technique.

Block 1102 obtains an application generated by a producer. Block 1104 identifies customizations made by a customizer to the application that are desired by a customer. In accordance with some implementations the customer will send a unique identifier (ID). The unique identifier can be utilized to identify and obtain the application and customization. For instance, the customer can send the unique ID in a query, such as a hyperlink. The unique ID can then be used to identify and obtain the associated application and customizations. The associated application and customizations can then be downloaded to the customer's computer.

Block 1106 installs the software application and the customizations on the customer's computer in a single operation. For instance, from the customer's perspective, the customer takes some affirmative action, such as clicking on a hyperlink and as a result the customized application is installed on their computer. The customer need not locate the application or customizations or manually install the application or customizations, or get the customizations and application to function as an integrated application.

Conclusions

Although techniques, methods, devices, systems, etc., pertaining to installing customized applications are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
    hosting multiple web-sites, including:
        an application web-site that relates to a software application that comprises application code from a producer,
        a customization web-site that relates to a customization of the software application that comprises customization code from a customizer, wherein installation of the customization code with the application code creates a customized application that has a different functionality than the software application, and
        a customer web-site that associates the software application and the customization with a unique identifier that is different than unique identifiers associated with other instances of the software application and other customizations to the software application, wherein the software application and the customization are associated with the unique identifier via a reference tool at the customer web-site, the reference tool also including locations of the software application and the customization and links to the software application and the customization;
    receiving a query reciting the unique identifier associated with the software application and the customization;
    responsive to the query, utilizing the unique identifier received with the query to locate the application code and the customization code;
    checking whether a computer that generated the query includes a download tool that is configured to automatically install the application code and the customization code as the customized application; and
    transferring the application code and the customization code to a recipient for automatic installation by the download tool,
    wherein the download tool is configured to modify the application code with the customization code to create the customized application prior to installation of the application code.

2. The method of claim 1, wherein the hosting is performed by the producer effective that control of the software application does not transfer to the customizer thereby eliminating a need to negotiate distribution issues between the producer and the customizer.

3. The method of claim 1, wherein the hosting is performed by a party that is not the producer or the customizer.

4. The method of claim 1, wherein the hosting comprises maintaining the software application on the application web-site and the customization on the customization web-site.

5. The method of claim 1, wherein the query is generated by selection of a hyperlink that contains the unique identifier associated with the software application and the customization and contains an address of the customer web-site.

6. The method of claim 1, further comprising checking whether the application code associated with the unique identifier received in the query is already installed on the computer and checking whether an update is available for the customization associated with the unique identifier received in the query.

7. The method of claim 6, wherein the hosting comprises creating a registration service that links the software application with the customization via the unique identifier.

8. A method, comprising:
    causing a customization generated by a customizer for a software application generated by a producer to be sent to a hosting website, obtaining a unique identifier that references the customization and the software application, sending a hyperlink to a customer, wherein the hyperlink contains an address of the hosting web-site and contains the unique identifier, wherein the causing comprises causing the customization and the software application to be sent to the hosting web-site that causes the customization and the software application to be stored in a database that associates the customization and the software application with the unique identifier, and wherein the obtaining comprises obtaining the unique identifier from the database, and wherein the sending comprises ensuring that the user has accepted terms of service associated with the customization and in an instance where the user has accepted the terms of service, utilizing the unique identifier to retrieve the software application code and the customization code from the database: and, responsive to a user that is associated with the customer activating the hyperlink containing the unique identifier, utilizing the unique identifier to locate the customization and the software application and sending a download tool, software application code, and customization code to the user, wherein the download tool is configured to:

install the customization code to modify the software application code prior to an installation process for the software application code, generate a customized application based on the modified software application code and customization code, and install the customized application on a computing device of the user.

9. The method of claim 8, wherein the causing, obtaining and sending are performed by the customizer.

10. The method of claim 9, wherein the customizer further controls the hosting web-site.

11. The method of claim 8, wherein the causing, obtaining and sending are performed by a different party that is not the customizer or the producer.

12. One or more computer-readable storage devices having instructions stored thereon that when executed by a computing device cause the computing device to perform acts, comprising:

responsive to a user selecting a link that includes a unique identifier for a customized application, utilizing the unique identifier to access a site associated with the customized application, the site configured to identify a software application and a customization that are associated with the customized application through the unique identifier;

obtaining code for the software application and code for the customization;

creating a customized application by modifying the code for the software application with the code for the customization prior to installing the code for the software application; and, installing the customized application on the computing device without requiring further action from the user beyond the user selecting the link that includes the unique identifier;

wherein:

the utilizing the unique identifier to access the site comprises providing user consent to the site, and the obtaining comprises obtaining a download tool, wherein the download tool:

obtains the code for the software application and the code for the customization, first installs the code for the customization on the computing device and then second installs the code for the application to produce the customized application, and runs the customized application for the user.

13. The one or more computer-readable storage devices of claim 12, wherein the obtaining comprises utilizing the unique identifier to locate the customization on a media such as one of a CD, a DVD, or a flash media.

14. The one or more computer-readable storage devices of claim 12, further comprising periodically searching for updates to the customization.

15. The method of claim 1, wherein the checking further comprises:

checking that the recipient that generated the query has accepted terms of use associated with the customized application; and further comprising:

in an instance where the recipient does not include the download tool, causing the download tool to be sent to the recipient prior to the transferring the application code and the customization code.

16. The method of claim 8, wherein the customized application is installed without requiring further user input after activation of the hyperlink containing the unique identifier.

17. The one or more computer-readable storage devices of claim 12, wherein the link is a hyperlink that contains an address of the site, and contains the unique identifier that references the code for the customization and the code for the software application.

* * * * *